No. 674,458.  
F. C. ESMOND.  
Patented May 21, 1901.

CLOSED CONDUIT SYSTEM OF ELECTRIC RAILWAYS.

(Application filed Nov. 21, 1895.)

(No Model.)  
3 Sheets—Sheet 1.

FIG. 1.

WITNESSES  
A. Macdonald  
R. B. Hull

INVENTOR  
Fredrick C. Esmond  
By Geo. R. Blodgett  
Atty.

No. 674,458. Patented May 21, 1901.
F. C. ESMOND.
CLOSED CONDUIT SYSTEM OF ELECTRIC RAILWAYS.
(Application filed Nov. 21, 1895.)
(No Model.) 3 Sheets—Sheet 2.
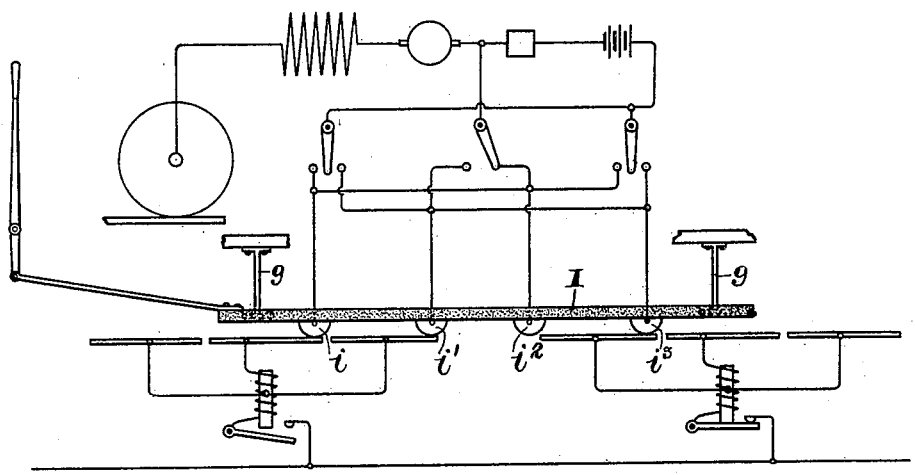
WITNESSES.
A. F. Macdonald.
J. B. Hull.
INVENTOR.
Frederick C. Esmond
By Geo. R. Blodgett
Atty.

No. 674,458. Patented May 21, 1901.
F. C. ESMOND.
CLOSED CONDUIT SYSTEM OF ELECTRIC RAILWAYS.
(Application filed Nov. 21, 1895.)
(No Model.) 3 Sheets—Sheet 3.
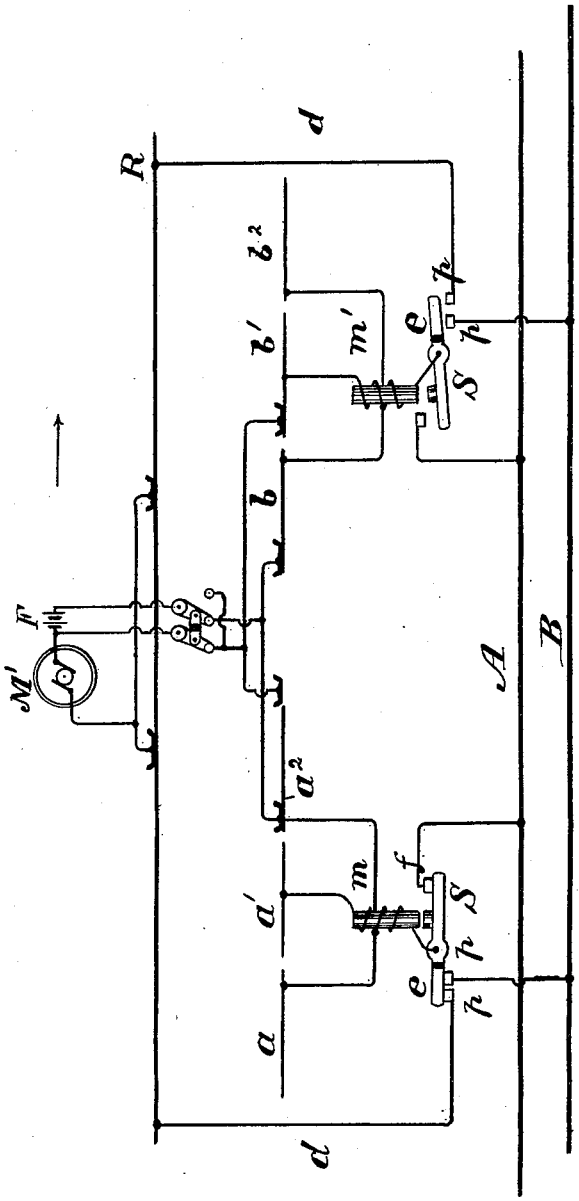
WITNESSES:
L. T. Shaw
L. H. Latimer
INVENTOR
Frederick C. Esmond
BY
Edward M. Bentley
ATTORNEYS

UNITED STATES PATENT OFFICE.

FREDERICK C. ESMOND, OF BROOKLYN, NEW YORK, ASSIGNOR TO ESMOND ELECTRIC TRACTION COMPANY, OF WEST VIRGINIA.

CLOSED-CONDUIT SYSTEM OF ELECTRIC RAILWAYS.

SPECIFICATION forming part of Letters Patent No. 674,458, dated May 21, 1901.

Application filed November 21, 1895. Serial No. 569,663. (No model.)

*To all whom it may concern:*

Be it known that I, FREDERICK C. ESMOND, a citizen of the United States, residing at Brooklyn, county of Kings, and State of New York, have invented certain new and useful Improvements in Closed-Conduit Systems of Electric Railways, (Case No. 302,) of which the following is a specification.

My present invention relates to a closed-conduit system of electric railways in which there is an insulated supply-circuit and a series of contact-sections of greater or less length, as is now well known in the art, which are normally out of circuit with the feeders, but which are connected thereto through switches of one form or another, so as to complete the circuit through the motors on the car. I have already made numerous applications for Letters Patent on such systems as these, and the present application is for further improvements. One of the principal features I now seek to claim consists of an arrangement for using the rails as part of the motor-circuit without having the rails directly and normally connected to the generators at the central station. For this purpose an all-metallic supply-circuit is provided distinct from the rails, and the contact-sections and rails are disconnected from the opposite branches of the supply-circuit, except as some of the switches are thrown by the car or cars traveling over the road. When by these switches the contact-sections are connected to one side of the supply-circuit, I establish, preferably by the same switch-operating mechanism, a second electrical connection through a switch between the rails and the other side of the supply-circuit. Preferably the rails will be divided into electrical sections of greater or less length, as may be convenient. In this way danger of leakage and to traffic in the streets is largely avoided. I also seek to claim herein certain improvements relating more particularly to the system shown in my application, Serial No. 562,183, filed September 11, 1895, issued as Patent No. 551,537, dated December 17, 1895, whose object is to make sure that the battery on the car may at all times be effective in closing one of the switches, and so starting the line into operation in case the motor-circuit has been broken. In the arrangement as shown in the prior application the working conductors are divided into sets of three, and the battery-circuit for throwing one of the switches is established between two of these sections connected by collectors to opposite terminals of the battery. Should the car happen to stop at a certain point, however, just as the collectors are passing from one contact-section to another, it is possible that one of the collectors might bridge the gap between two of the contact-sections, so as to short-circuit the magnet and render the battery ineffective for its intended function.

In this invention the same general arrangement of conductors is employed, but means are provided for avoiding the possible difficulty just described. I accomplish this mechanically by mounting the collectors so that they can be thrown backward or forward a slight distance sufficient to prevent the possible short circuit, or I accomplish the same result by dividing up the collectors in a manner more particularly described hereinafter.

In the accompanying drawings, Figure 1 is a diagram showing the system now proposed in one of its forms. Fig. 2 shows another arrangement of the collectors, and Fig. 3 shows the same system without the split or divided contact devices.

In Fig. 1 the generators at the central station are represented by G, and the feeder or supply circuit by two mains A B, connected to the generator. The contact-sections are shown arranged in sets of three, of which the sections of one set are marked $a\ a'\ a^2$ and of the second set $b\ b'\ b^2$. S S' are switches for connecting the contact-sections with the main B through suitable contact-points $t\ t$. These switches are operated by electromagnets $m$, which may be arranged in a number of ways, but as here shown having one terminal connected to the switch, the opposite terminal to the contact-sections $a'\ b'$, while the other contact-sections of each set are connected, as shown, at an intermediate point in the coil of the corresponding magnet. The track-rails are represented at R and form part of the circuit through the driving motor or motors M' and the wheels W. The track-rails preferably will be divided at points into insulated sections, as shown at $c\ c'$, and each section will be connected by a lead $d$ to a switch joining the rails to the supply-main A. In the arrangement shown the switch S performs this function. It carries a contact $e$, insulated from the remainder of the switch and adapted to bridge the contact-points $p\ p'$ when the switch is closed. Of course other arrangements of switches may be used, but it is mechanically simpler to combine the switches connecting the contact-sections and the rails with the supply-mains into one structure and have them both operated by one magnet. This is more clearly illustrated in Fig. 3, wherein, as before, A and B are the two line conductors extending from the generator along the line of the railway. R is the track-rail divided up into a series of insulated conductor-sections corresponding to the line conductors B, while the second series of conductor-sections corresponding to the main line A is made up of the sections $a\ a'\ a^2\ b\ b'\ b^2$, &c. The car-wheels or other suitable means will serve as a contact device connected to one motor-terminal and bearing upon the series of contact-sections made up by the insulated lengths of the rail R, while, as above described, a second contact device will be connected to the opposite motor-terminal and bear upon the second series of contact-sections. $m\ m'$, &c., constitute a single series of electromagnetic coils, which in the manner described will be connected successively in series with the motor on one side thereof, being connected between one terminal of the motor and its corresponding line conductor A, while the switches S S', &c., operated by the said magnetic coils, respectively, will each control a line connection between the successive sections of rail R and its corresponding line conductor B. This line connection is direct, in that it contains no switch-operating coils nor otherwise serves actively in the controlling operations. It is also evident that in whichever direction the car and contact devices are traveling the successive sections of rail-conductor R will be connected to the line conductor B and energized by its respective switch at or before it is reached by the contact device.

With the parts as shown in the drawings, Fig. 1, current will flow through the switch S, contact-section $a^2$, collector 2, collector 6, a portion of magnet $m'$, contact-section $b'$, through switch $S^2$, by way of collector 8, motor M', track-rails R, and back to the supply-main A by way of line $d$ and contacts $e$, $p$, and $p'$. This will close the switch S', and current will flow from the different contact-sections and collectors, so as to maintain the motor-circuit constant and close the various switches successively in a manner which will be understood from the drawings and very similar to that set forth in my prior application.

A battery F is provided on the car, one terminal of which is connected through resistance $r$ to one terminal of the motor, and the other battery-pole leads to switches $s'\ s^2$, which may be thrown upon the contacts 9, 10, 11, 12, 13, 14, 15, and 16, so as to charge the battery or enable it to pick up the switches. For example, with the car traveling in the direction of the arrow, and assuming that the collectors 1 and 3 stand, respectively, upon the contact-sections $a'\ a^2$, as would be the case just after it passes the position shown in the drawings, then by throwing the switch $s^2$ upon the contact 14 a circuit would be formed from battery F to switch $s^2$, to point 14, (the switch being assumed to be turned to this point,) to collector 1, and thence through contact-section $a'$, the magnet $m$, contact section $a^2$, collector 3, switch $S^2$, and resistance $r$. It will thus be observed that the collectors 1 and 3 are connected to opposite sides of the battery-circuit. Now if, as in my former application, each of these contacts was of such length as to bridge over the gap between adjacent contact-sections there would be a possible point where this battery-circuit might short-circuit the magnet-coil of the switch to be picked up. For example, if the collectors 1 and 2 were not split or divided up, as in my present invention, and connected to one pole of the battery this might form a direct connection between the contact-sections $a'$ and $a^2$, while a collector connected to the other pole of the battery also rested upon the section $a^2$. The magnet $m$ would then be short-circuited. One way of overcoming this possible difficulty is by arranging the collectors, as shown in Fig. 1, so that no such short-circuiting is possible, for each one is not long enough of itself to bridge the gap between two adjacent contact-sections while the collector connected to the other pole of the battery is on one of said sections. Collectors 1 and 2 are connected to contact-points 9 and 13, also to 10 and 14, and may be joined to the positive pole of the battery by switches $s'\ s^2$, which may be connected to a contact-point 17, which by switch $S^2$ may be joined to one terminal of the motor and the second terminal of the battery. Collectors 2 and 6 are likewise joined to contact-points 10, 13, and 18, collectors 3 and 7 to contact-points 11, 15, and 19, and collectors 4 and 8 to contact-points 12, 16, and 20. In all ordinary cases it will be sufficient to throw the switch $s^2$ upon the contacts 14 or 15 at one end of the car or the switch $s'$ upon the contacts 10 or 11 at the other end of the car, which will, when necessary, establish the battery-circuit through the collectors 5 and 7 or 1 and 3, according to the direction in which the current is moving; but if the car should happen to stop at a point where these collectors do not properly contact with the conductor-sections then it is only necessary to throw the switches $s'$ or $s^2$ to a different point, so as to establish the battery-circuit through the collectors 2 and 4 or 6 and 8, for these last collectors will always be properly located to accomplish the desired purpose when their collectors are incapable of so doing.

In Fig. 2 I show another arrangement for accomplishing the same object. Here there are only four collectors $i\ i'\ i^2\ i^3$, connected to the battery and motor in a way analogous to that already described and which will be understood from the drawings. These collectors are mounted on a bar or frame I, hung by links $g$ from the car-truck, and a lever is provided, so that the frame may be moved backward or forward a short distance. Should then the car stop in such position that the battery-circuit would short-circuit the magnet to be picked up, it is only necessary to throw the lever so as to move the collectors a slight distance backward, when the bridge formed by one of them between two adjacent sections will be broken, and they will be properly set, so as to send current through the magnet to be picked up.

What I claim as new, and desire to secure by Letters Patent of the United States, is—

1. In an electric railway, the combination with two series of conductor-sections, of two contact devices connected respectively to the opposite motor-terminal and bearing on the two series of conductor-sections respectively, two line conductors extending from a generator along the line of the railway and corresponding respectively to the two series of conductor-sections and to the two motor-terminals connected to the said series of conductor-sections respectively by means of the contact devices aforesaid, a single series of electromagnetic coils connected successively in series with the motor on one side thereof, switches operated by said coils respectively, and a direct connection between the opposite side of the motor and its corresponding line conductor controlled by each of the said switches.

2. In an electric railway the combination with two series of conductor-sections, of two corresponding line conductors, a single series of electromagnetic coils having their controlling-terminals connected each to a section of one of the said series of conductor-sections, switches operated by said coils respectively and each controlling a direct connection between a conductor-section in the other one of the two series of sections and its corresponding line conductor, and two contact devices on the vehicle connected respectively to the opposite motor-terminals and bearing respectively on the two series of conductor-sections, the said devices being placed on the vehicle in such relation to each other and to the conductor-sections, that the energizing of each of the successive coils, by the connection of one of the said contact devices with its controlling-terminal, will close the said direct connection to the opposite series of conductor-sections at or before the engagement therewith of the corresponding contact device, irrespective of the direction of travel of the said devices.

3. In an electric railway the combination with two line conductors of two series of conductor-sections corresponding thereto, two contact devices leading to the respective motor-terminals and bearing each on one of the said series of conductor-sections respectively, a series of electromagnetic coils connected successively between one motor-terminal and its corresponding line conductor, a series of switches operated by said coils respectively and a series of line connections between the opposite motor-terminal and its corresponding conductor, the said connections being controlled by the said switches respectively in such relation to the contact device corresponding to said opposite motor-terminal that in either direction of travel of said device a contact point or section will be energized by its respective switch at or before it is reached by the said contact device.

4. The combination in an electric-railway system of mains forming a complete metallic supply-circuit, insulated contact-sections arranged in sets of three, as described, switches for connecting these contact-sections with one of the supply-mains, electromagnets each connected to one set of contact-sections, collectors on the car for carrying current to the motor and establishing a circuit through the electromagnet of an advance set of sections, the track-rails forming a part of the motor-circuit normally disconnected from the supply-circuit and switches also actuated by the electromagnets for connecting the rails with the supply-circuit, substantially as described.

5. The combination with positive and negative main conductors, of two series of contact points or sections along the railway corresponding to said conductors respectively, electromagnets between one main conductor and the corresponding series of points or sections respectively and a switch operated by each magnet having one terminal connected to the other main conductor and its opposite terminal connected to one of the series of points or sections corresponding to the said other main conductor, whereby a magnet in circuit between one main conductor and the motor controls the connection between the other main conductor and one of its points or sections.

In witness whereof I have hereunto set my hand this 7th day of November, 1895.

FREDERICK C. ESMOND.

Witnesses:
B. B. HULL,
A. F. MACDONALD.